(12) United States Patent
DeJong et al.

(10) Patent No.: US 8,316,513 B2
(45) Date of Patent: Nov. 27, 2012

(54) DEVICE FOR ATTACHING TWO ADD-ON PARTS TO A CARRIER PART

(75) Inventors: Michael DeJong, Binzen (DE); Jens Breitenfeld, Lörrach (DE)

(73) Assignee: A. Raymond et Cie, Grenoble (FR)

( * ) Notice: Subject to any disclaimer, the term of this patent is extended or adjusted under 35 U.S.C. 154(b) by 375 days.

(21) Appl. No.: 12/678,663

(22) PCT Filed: Aug. 14, 2008

(86) PCT No.: PCT/EP2008/006679
§ 371 (c)(1),
(2), (4) Date: Apr. 23, 2010

(87) PCT Pub. No.: WO2009/039919
PCT Pub. Date: Apr. 2, 2009

(65) Prior Publication Data
US 2010/0196090 A1    Aug. 5, 2010

(30) Foreign Application Priority Data
Sep. 21, 2007   (DE) .................. 10 2007 045 296

(51) Int. Cl.
*A44B 99/00* (2010.01)
(52) U.S. Cl. ............... 24/293; 24/294; 24/295
(58) Field of Classification Search .............. None
See application file for complete search history.

(56) References Cited

U.S. PATENT DOCUMENTS

| | | | |
|---|---|---|---|
| 2,864,472 A * | 12/1958 | Fernberg | 52/511 |
| 6,431,584 B1 * | 8/2002 | Nagasawa et al. | 280/728.2 |
| 6,431,585 B1 * | 8/2002 | Rickabus et al. | 280/728.3 |
| 7,226,260 B2 | 6/2007 | Jackson, Jr. et al. | |
| 7,374,200 B2 * | 5/2008 | Ikeda et al. | 280/728.2 |
| 7,900,953 B2 * | 3/2011 | Slobodecki et al. | 280/728.2 |
| 8,038,167 B2 * | 10/2011 | Slobodecki et al. | 280/728.2 |
| 2005/0217083 A1 | 10/2005 | Tashima et al. | |
| 2006/0066080 A1 | 3/2006 | Ikeda et al. | |
| 2006/0239772 A1 * | 10/2006 | Kuroda | 403/329 |
| 2008/0028577 A1 * | 2/2008 | Soman et al. | 24/293 |
| 2008/0193250 A1 * | 8/2008 | Boubtane | 411/48 |
| 2009/0205174 A1 * | 8/2009 | Slobodecki et al. | 24/458 |
| 2011/0156377 A1 * | 6/2011 | Slobodecki et al. | 280/728.2 |

FOREIGN PATENT DOCUMENTS

| | | |
|---|---|---|
| FR | 2785339 A1 | 5/2000 |
| GB | 2364973 A | 2/2002 |
| WO | WO2007/025687 A1 | 3/2007 |

\* cited by examiner

*Primary Examiner* — Jack W. Lavinder
(74) *Attorney, Agent, or Firm* — Faegre Baker Daniels

(57) ABSTRACT

The invention relates to a device for attaching two add-on parts (36, 37) to a carrier part (35), said device having an outer clamp (1) and an inner clamp (11) that arrests any movement of the outer clamp (1), said clamps being insertable, in an interlocked arrangement, into a single insertion opening configured in the carrier part (35) so as to hold not only an add-on part (37) that is movable relative to the carrier part (35), but also the additional add-on part (36), on the carrier part (35) with a high extraction force for each.

9 Claims, 5 Drawing Sheets

DEVICE FOR ATTACHING TWO ADD-ON PARTS TO A CARRIER PART

CROSS-REFERENCE TO RELATED APPLICATION

This application is a U.S. National Phase Patent Application based on International Application Serial No. PCT/EP2008/006679 filed Aug. 14, 2008, the disclosure of which is hereby explicitly incorporated by reference herein.

BACKGROUND OF THE INVENTION

1. Field of the Invention

The present invention relates to a device for attaching two add-on parts to a carrier part.

2. Description of the Related Art

In conventional devices for attaching two add-on parts to a carrier part, each add-on part normally has a separate attaching element, each of which is to be anchored in a respective opening provided for this purpose in the carrier part. This is disadvantageous, however, for example when space is limited or when the carrier parts in question are fairly heavily loaded structurally.

SUMMARY OF THE INVENTION

The present invention provides a device for attaching two add-on parts to a carrier part by which two add-on parts can be attached to a carrier part with economy of space, with relatively little weakening of the carrier part, and relatively easily.

By virtue of the fact that the device according to the invention comprises an outer clamp configured with two shank arms and an inner clamp that is disposed between the outer clamp, both of which clamps enter into engagement with the carrier part, via the rear engagement sections and via the bearing sections, respectively, and each of which secures a respective add-on part to the carrier part by means of, respectively, the hold-down tabs and the on-lying tabs, only one insertion opening need be provided in the carrier part for the entire inventive device. The resulting attachment of the two add-on parts is space-saving, structurally minimally weakening, and, due to the inventive configuration of the outer and inner clamps, very easy to perform manually.

In one form thereof, the present invention provides a device for attaching two add-on parts to a carrier part, including an outer clamp that is fabricated from a sheet metal strip as a one-piece stamped and bent part and has two shank arms disposed opposite each other and connected to each other at one end, and, at the other, free end of each shank arm, a laterally protruding hold-down tab, wherein each shank arm of the outer clamp has a rear engagement section that extends from a connection end toward the other shank arm and is disposed a first distance from the hold-down tab; and including an inner clamp disposed between the shank arms of the outer clamp and having two oppositely disposed side legs that are connected to each other at one end, characterized in that the inner clamp is fabricated from a sheet metal strip as a one-piece stamped and bent part; in that a laterally protruding on-lying tab is configured at the other end of each side leg of the inner clamp; in that the inner clamp enters into engagement with the carrier part via bearing sections configured each on a respective rear engagement tongue; in that each side leg of the inner clamp has a respective bearing section which extends from a connecting end toward the other side leg and which is a second distance from the on-lying tabs that is greater than the first distance of the rear engagement sections from the hold-down tabs of the outer clamp; and in that, on the inner clamp, each side leg includes, on the side of the bearing section remote from the bearing tab, a stop dog that extends obliquely outward by its free end.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
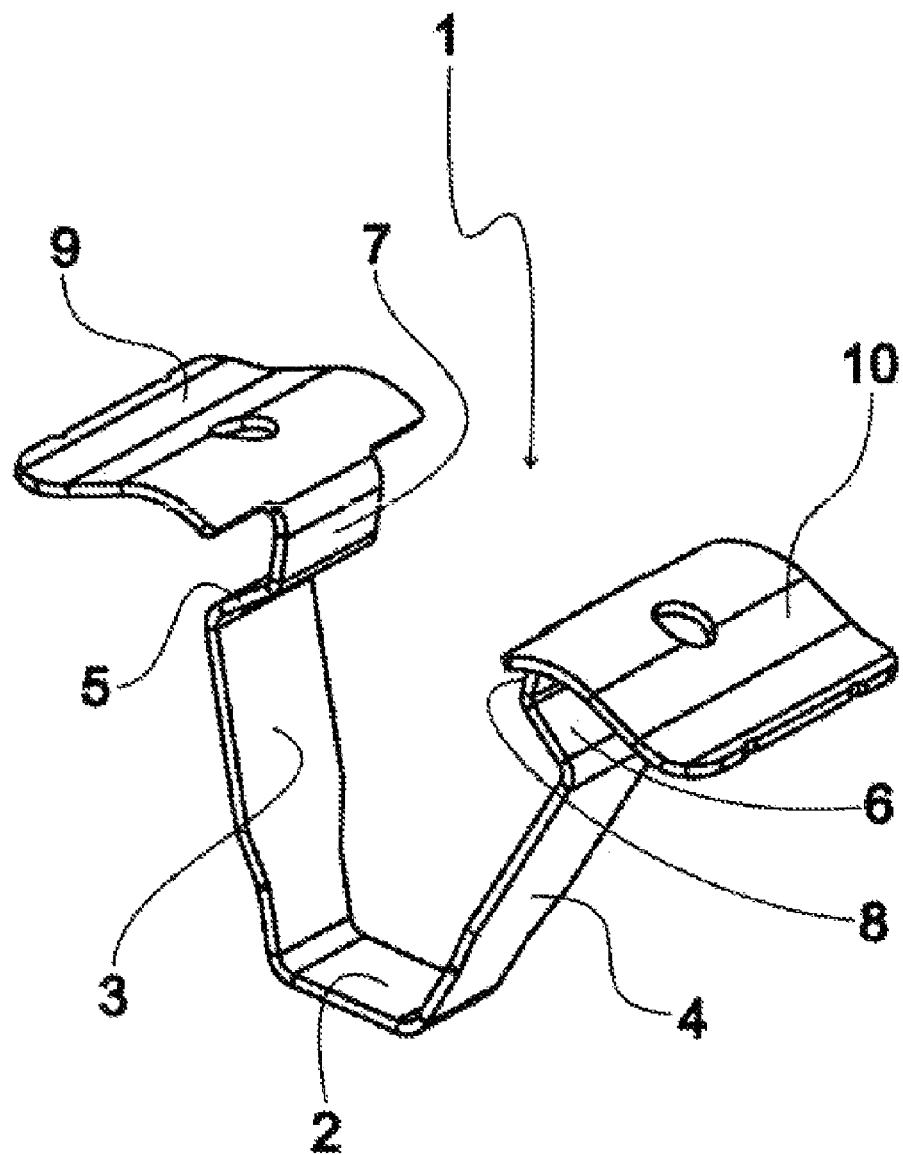
FIG. 1 is a perspective view of an outer clamp as per an exemplary embodiment of a device according to the invention.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed invention to the precise form disclosed.

DETAILED DESCRIPTION

FIG. 1 is a perspective view of an outer clamp 1 of an exemplary embodiment of a device according to the invention. Said outer clamp 1 is fabricated from a sheet metal strip as a one-piece stamped and bent part, and has a planar bottom section 2 with a square or rectangular base area. Formed on two mutually opposite edge sides of bottom section 2 are shank arms 3, 4, which are inclined with respect to each other and which initially diverge with increasing distance from bottom section 2, and each of which has a rear engagement section 5, 6 in its respective end region remote from bottom section 2. The rear engagement section 5, 6 of each shank arm 3, 4 is bent inward and extends from an outward-lying connecting end away from bottom section 2 and toward the respective opposite shank arm 3, 4.

Formed at the facing ends of the rear engagement sections 5, 6 are respective bearing sections 7, 8, which in turn are connected, each at its edge side directed away from rear engagement section 5, 6, to a respective hold-down tab 9, 10. The hold-down tabs 9, 10 each extend outward and protrude laterally beyond the respective shank arm 3, 4. To give the outer clamp 1 a certain elasticity in the longitudinal direction, i.e., in the direction of the shank arms 3, 4, the hold-down tabs 9, 10 are configured as S-shaped, with the outer bend, i.e., the one farthest from the particular bearing section 7, 8 in the longitudinal direction of the outer clamp 1, disposed closer to the bottom section 2 than the inner bend, i.e., the one close to the particular bearing section 7, 8. In addition, the dimensions of the bearing sections 7, 8 and the dimensions of the hold-down tabs 9, 10 are so adapted to one another that the outer bends of the hold-down tabs 9, 10 are disposed a first distance from the rear engagement sections 5, 6 in the longitudinal direction of the outer clamp 1. It can also be observed from FIG. 1 that the hold-down tabs 10 are wider than the shank arms 3, 4.

Figure 2:
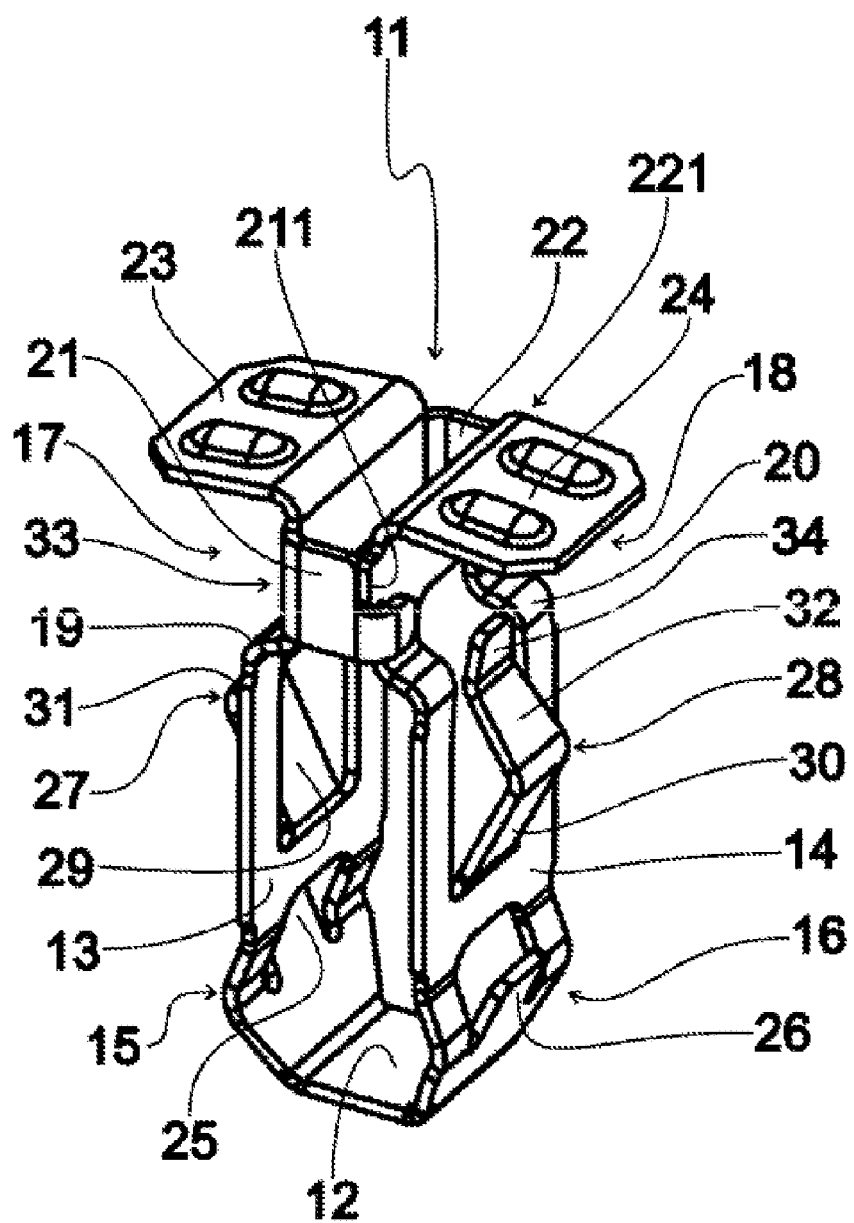
FIG. 2 is a perspective view of an inner clamp as per the described exemplary embodiment of a device according to the invention.

FIG. 2 is a perspective view of an inner clamp 11 of the described exemplary embodiment of a device according to the invention. Like outer clamp 1, inner clamp 11 is fabricated from a sheet metal strip as a one-piece stamped and bent part, and has a planar foot section 12 with a square or rectangular base area, the dimensions of the foot section 12 of inner clamp 11, for purposes of compact construction, being approximately equal to those of the bottom section 2 of outer clamp 1. Configured on mutually opposite edge sides of foot section 12 are side legs 13, 14, which extend from a bulged section 15, 16 immediately adjacent foot section 12 and are disposed approximately at right angles to foot section 12, thus being oriented substantially parallel to each other. At the ends remote from foot section 12, side legs 13, 14 approach each other in their respective head sections 17, 18 via an inwardly directed bend 19, 20 and are connected to each other via respective side links 21, 22, which are configured on each side leg 13, 14 and embrace the respective other side leg 13, 14. Each of the side links 21, 22 attaches to a respective interlock web 211, 221 that is configured on the respective opposite head section 17, 18 and extends outward within the plane of the head sections 17, 18. The side legs 13, 14 are thereby solidly connected to each other in the region of the head sections 17, 18 and are locked against any movement toward or away from each other.

Formed on each side leg 13, 14, on the side of each head section 17, 18 facing away from foot section 12, is a respective laterally outwardly projecting on-lying tab 23, 24 is oriented approximately at right angles to the side legs 13, 14 and parallel to the foot section 12. The width of the on-lying tabs 23, 24 is substantially the same as that of the side legs 13, 14.

It will also be noted from FIG. 2 that each side leg 13, 14 has in its bulged section 15, 16 a respective stop dog 25, 26 that is canted obliquely outward away from foot section 12 and whose end pointing away from foot section 12 protrudes laterally outward beyond the respective side leg 13, 14. Configured on each side leg 13, 14 between the bulged section 15, 16 and the bend 19, 20 is a rear engagement tongue 27, 28, which is connected by its end proximate the respective bulged section 15, 16 to the respective side leg 13, 14. From this connection region, an adjusting section 29, 30 of each rear engagement tongue 27, 28 extends obliquely outward away from foot section 12. Joined to the end of each adjusting section 29, 30 remote from foot section 12 is a bearing section 31, 32, which extends from an outwardly disposed connecting end inward toward the respective head section 17, 18, and is set at an oblique angle. Finally, each rear engagement tongue 28, 29 has at its free end an end section 33, 34 that is oriented approximately parallel to the longitudinal direction of the inner clamp 11.

The bearing sections 30, 31 and the on-lying tabs 23, 24 are a second distance apart that is greater than the first distance between the rear engagement sections 5, 6 and the hold-down tabs 9, 10 of outer clamp 1.

Figure 3:
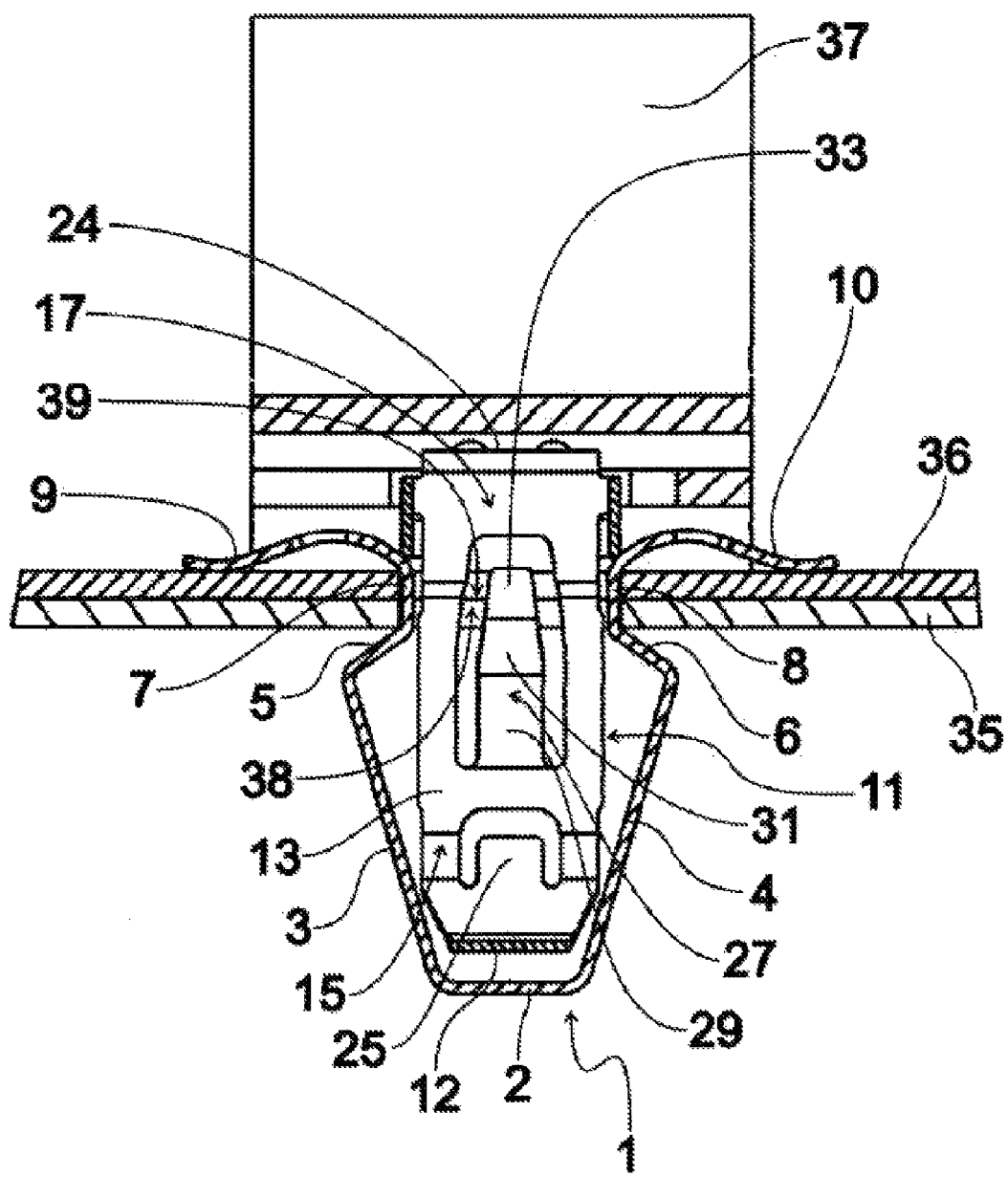
FIG. 3 is a first longitudinal section of the outer clamp according to FIG. 1 and the inner clamp according to FIG. 2 as per the described exemplary embodiment of a device according to the invention in an assembled arrangement, in engagement with a carrier part and with two add-on parts.

FIG. 3 represents a first longitudinal section of the outer clamp 1 according to FIG. 1 and the inner clamp 11 according to FIG. 2, as per the described exemplary embodiment, in an arrangement where they are inserted one inside the other in an installed situation, in which a carrier part 35, for example in the form of an autobody panel, is connected to a fabric mat 36 of an airbag assembly, as a first add-on part, and to a mounting housing 37, configured as the "retainer" of the airbag assembly, as a second add-on part. As can be seen from FIG. 3, the hold-down tabs 9, 10 of outer clamp 1 bear against the fabric mat 36, while the rear engagement sections 5, 6 of the outer clamp 1 are engaged, in their inner edge regions, with the rim of an insertion opening 38 formed in the carrier part 35. The inclination of the rear engagement sections 5, 6, together with the elasticity afforded by the curved hold-down tabs 9, 10, act to bring about tolerance compensation with respect to the thickness of the carrier part 35 and/or of the first add-on part, here in the form of the fabric mat 36.

The bearing sections 8, 9 of outer clamp 1 lie with their outward sides against the insertion opening 38 provided in carrier part 35, and against a through-clearance 39 provided in the fabric mat 36, whereas the inner sides of bearing sections 8, 9 butt against inner clamp 11 in response to even a relatively slight movement of the shank arms 3, 4 of outer clamp 1 toward each other, causing the outer clamp 1 to be anchored to the carrier part 35 with a high extraction force despite relatively flexible construction.

Figure 4:
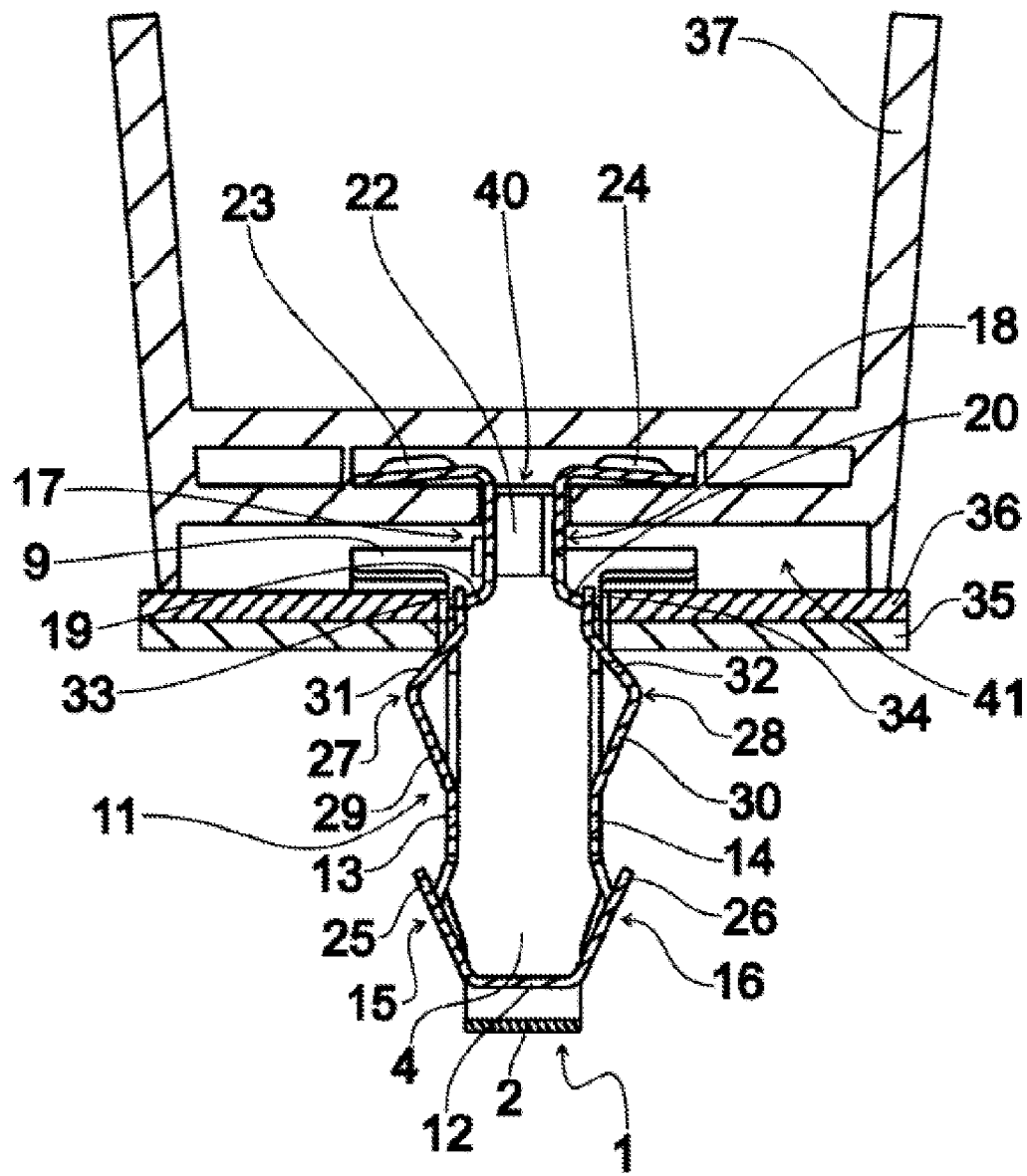
FIG. 4 is a second longitudinal section of the arrangement according to FIG. 3, taken at right angles to the longitudinal section of FIG. 3.

FIG. 4 shows the outer clamp 1 according to FIG. 1 and the inner clamp 11 according to FIG. 2 in a second longitudinal section, depicting the described exemplary embodiment of a device according to the invention in the arrangement of FIG. 4, the section plane of the second longitudinal section being roughly perpendicular to the section plane of the first longitudinal section, that of FIG. 3. It can be seen from FIG. 4 that the on-lying tabs 23, 24 of inner clamp 11 are disposed in a receiving space 40 formed in the mounting housing 37, and secure the mounting housing 37 to the carrier part 35 by the fact of the bearing sections 31, 32 of rear engagement tongues 27, 28 of inner clamp 11 bearing against the rim region of the insertion clearance 38. Meanwhile, the hold-down tabs 9, 10 of outer clamp 1 are disposed in a chamber space 41 formed in the mounting housing 37.

Figure 5:
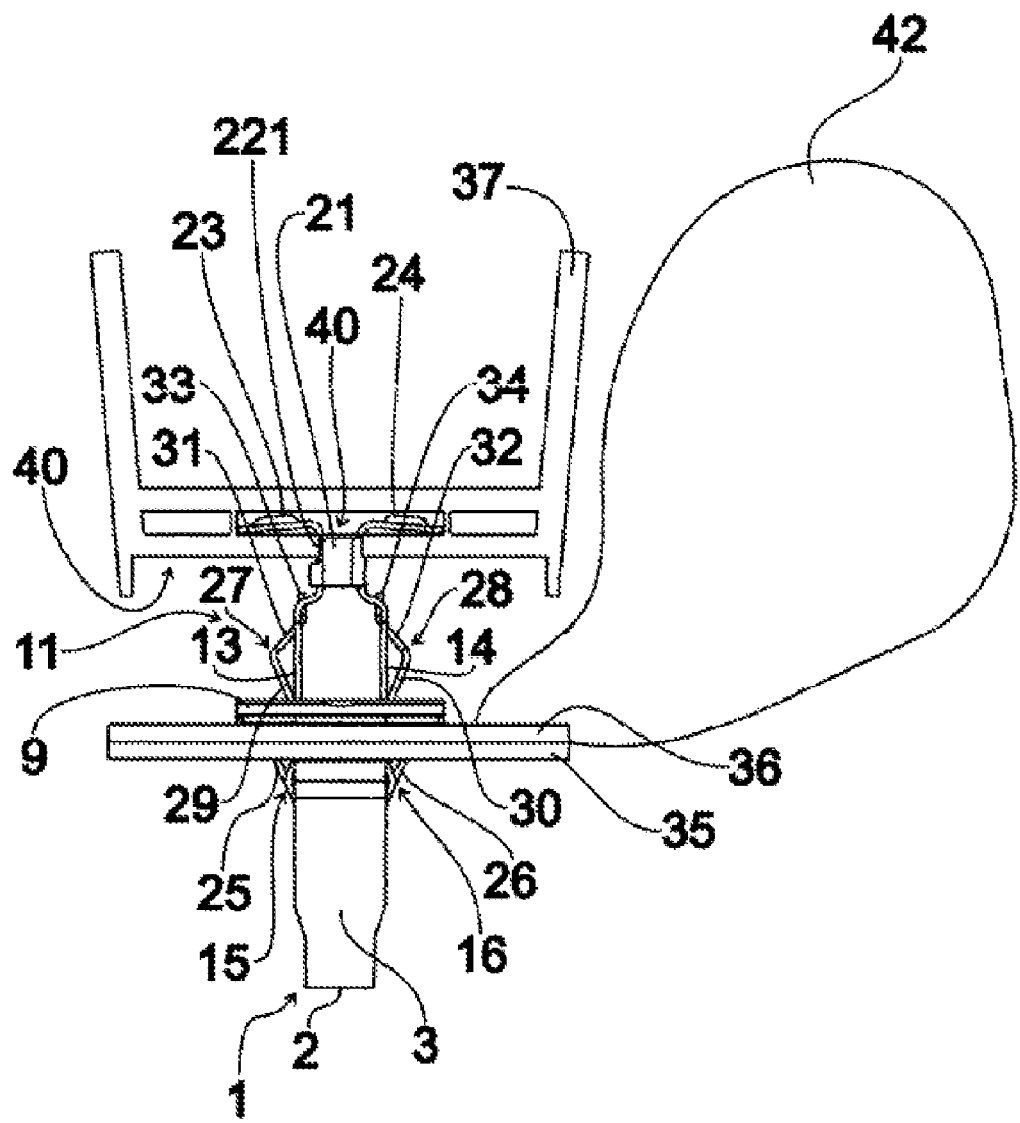
FIG. 5 is a side view of the exemplary embodiment according to FIGS. 1 to 4, with an inner clamp partially withdrawn from the outer clamp.

FIG. 5 is a side view of the outer clamp 1 according to FIG. 1 and the inner clamp 11 according to FIG. 2 as per the described exemplary embodiment of a device according to the invention, in an arrangement where the inner clamp 11 is pulled a displacement distance out of the outer clamp 1, compared to the arrangement of FIGS. 3 and 4. The arrangement according to FIG. 5 is realized, for example, when, after an airbag 42 of which the fabric mat 36 is a part has expanded, as illustrated schematically in FIG. 5, the depicted mounting housing 37 and any other mounting housings 37 (not shown) are lifted off the carrier part 35 as a result of the high forces in play after the deflection of the rear engagement tongues 27, 28 of inner clamp 11. The ends of the stop dogs 25, 26 of the side legs 13, 14 of inner clamp 11 meanwhile butt against the rim region of the insertion clearance 38 of carrier part 35 and block any further withdrawal of inner clamp 11 from outer clamp 1, short of excessive forces having a destructive effect. Since inner clamp 11 is still between the bearing sections 7, 8 of outer clamp 1, even in this pulled-out arrangement, the solidity of the connection of the fabric mat 36 to the carrier part 35 is preserved, since the shank arms 3, 4 of the outer clamp 1 are still unable to move toward each other because of the locking action of the inner clamp 11.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A device for attaching two add-on parts to a carrier part, said device comprising:
   an outer clamp, including two shank arms disposed opposite each other and connected to each other at a first end, said outer clamp further including a laterally protruding hold-down tab at a second, free end of each said shank arm, each said shank arm further including a rear engagement section that extends from a connection end toward the other said shank arm and disposed a first distance from said hold-down tab; and
   an inner clamp, said inner clamp disposed between said shank arms of said outer clamp and including two oppositely disposed side legs connected to each other at one end, each said side leg further including a laterally protruding on-lying tab configured at another end opposite said one end and a respective rear engagement tongue, said rear engagement tongue including a bearing section extending toward the other respective said side leg and disposed a second distance from said on-lying tabs that is greater than the first distance, said inner clamp engageable with said carrier part via said bearing sections, and each side leg including, on a side of said bearing section remote from said bearing tab, a stop dog that extends obliquely outward and includes a free end.

2. The device of claim 1, wherein said outer clamp further includes planar bearing sections configured between said hold-down tabs and mutually facing ends of said rear engagement sections.

3. The device of claim 1, wherein said outer clamp further includes a planar bottom section connecting said first ends of said shank arms.

4. The device of claim 3, wherein said inner clamp further includes a planar foot section configured between the ends of said side legs facing away from said on-lying tabs, said planar foot section dimensioned substantially the same as said bottom section of said outer clamp.

5. The device of claim 4, wherein said inner clamp further includes a head section connecting said ends of said side legs opposite said foot section.

6. The device of claim 1, wherein each bearing section of said inner clamp is configured on a resilient rear engagement tongue including a free end facing a respective said on-lying tab.

7. The device of claim 6, wherein said free end of each said rear engagement tongue terminates in a planar end section.

8. The device of claim 1, wherein said outer clamp is fabricated from a sheet metal strip as a one-piece stamped and bent part.

9. The device of claim 1, wherein said inner clamp is fabricated from a sheet metal strip as a one-piece stamped and bent part.

* * * * *